US009086949B2

(12) United States Patent
Kaita et al.

(10) Patent No.: US 9,086,949 B2
(45) Date of Patent: Jul. 21, 2015

(54) CONTROL DEVICE FOR VEHICLE

(75) Inventors: Keiji Kaita, Miyoshi (JP); Masaya Amano, Toyota (JP); Takeshi Hoshiba, Anjo (JP); Koji Hokoi, Toyota (JP); Takahiko Hirasawa, Toyota (JP); Masashi Yoshimi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 35 days.

(21) Appl. No.: 13/984,969

(22) PCT Filed: Feb. 14, 2011

(86) PCT No.: PCT/JP2011/053006

§ 371 (c)(1), (2), (4) Date: Aug. 12, 2013

(87) PCT Pub. No.: WO2012/111066

PCT Pub. Date: Aug. 23, 2012

(65) Prior Publication Data

US 2013/0317720 A1 Nov. 28, 2013

(51) Int. Cl.

| | |
|---|---|
| ***F16H 59/10*** | (2006.01) |
| ***F16H 61/12*** | (2010.01) |
| ***G06F 17/00*** | (2006.01) |
| ***F02D 29/02*** | (2006.01) |
| ***F02N 11/08*** | (2006.01) |
| *F16H 59/44* | (2006.01) |
| *B60K 28/00* | (2006.01) |

(52) U.S. Cl.

CPC ................ *G06F 17/00* (2013.01); *F02D 29/02* (2013.01); *F02N 11/0803* (2013.01); *F16H 59/105* (2013.01); *F16H 61/12* (2013.01); *B60K 2028/003* (2013.01); *F02N 2200/0802* (2013.01); *F16H 2059/446* (2013.01); *F16H 2061/1284* (2013.01)

(58) Field of Classification Search

CPC ........................ F16H 59/105; F16H 2061/1284
USPC ............................................................ 701/99
See application file for complete search history.

(56) References Cited

U.S. PATENT DOCUMENTS 6,056,669 A * 5/2000 Marshall ......................... 74/335
6,376,929 B1 * 4/2002 Nakajima .................... 307/10.1

(Continued)

FOREIGN PATENT DOCUMENTS

JP 2000-296728 A 10/2000
JP 2001-289067 A 10/2001

(Continued)

*Primary Examiner* — Behrang Badii
*Assistant Examiner* — David Testardi
(74) *Attorney, Agent, or Firm* — Kenyon & Kenyon LLP

(57) ABSTRACT

During the deactivation of a driving system of a vehicle, an ECU determines whether or not a P range abnormality occurs which exhibits that a shift signal transmitted from a shift position sensor includes a P signal and an MJ signal corresponding to the P range as well as a different-type signal other than the P signal and the MJ signal. When the P range abnormality occurs, the ECU determines whether or not the vehicle-stopped state can be assured based on whether or not a brake-ON state (a hydraulic braking force or a parking braking force are beyond the range capable of maintaining vehicle-stopped state) is present. In a case where a P range abnormality occurs, when ECU determines that the vehicle-stopped state can be assured, the ECU allows the activation of the driving system.

3 Claims, 10 Drawing Sheets

800
SYSTEM ACTIVATION REQUEST
SHIFT SIGNAL
ABNORMALITY DETERMINATION
NORMAL
ABNORMAL
STOP ASSURANCE
SYSTEM ACTIVATION
810
830
STOP ASSURANCE DETERMINATION
820

(56) References Cited

U.S. PATENT DOCUMENTS

| | | | | |
|---|---|---|---|---|
| 7,203,587 | B2 * | 4/2007 | Tamaru et al. | 701/64 |
| 7,247,121 | B2 * | 7/2007 | Takagi | 477/34 |
| 7,412,907 | B2 * | 8/2008 | Oohori et al. | 74/335 |
| 7,584,681 | B2 * | 9/2009 | Kozaki et al. | 74/335 |
| 8,044,787 | B2 * | 10/2011 | Katrak et al. | 340/456 |
| 8,204,712 | B2 * | 6/2012 | Katrak | 702/150 |
| 8,209,098 | B2 * | 6/2012 | Buur et al. | 701/55 |
| 8,335,619 | B2 * | 12/2012 | Ueno | 701/51 |
| 8,423,232 | B2 * | 4/2013 | Tsutsumi et al. | 701/29.7 |
| 8,620,542 | B2 * | 12/2013 | Ueno et al. | 701/55 |
| 8,676,460 | B2 * | 3/2014 | Ueno et al. | 701/58 |
| 2005/0126322 | A1 | 6/2005 | Kozaki et al. | |
| 2011/0098881 | A1 | 4/2011 | Tsutsumi et al. | |
| 2011/0202231 | A1 * | 8/2011 | Ueno et al. | 701/34 |
| 2013/0317715 | A1 * | 11/2013 | Kaita et al. | 701/63 |
| 2013/0325275 | A1 * | 12/2013 | Kaita et al. | 701/63 |

FOREIGN PATENT DOCUMENTS

| | | | | | |
|---|---|---|---|---|---|
| JP | 2001-294056 | A | | 10/2001 | |
| JP | 2003-065436 | A | | 3/2003 | |
| JP | 2003294134 | A | * | 10/2003 | F16H 61/18 |
| JP | 2005-172118 | A | | 6/2005 | |
| JP | 2005240992 | A | * | 9/2005 | F16H 61/12 |
| JP | 2007218298 | A | * | 8/2007 | |
| JP | 2009-248912 | A | | 10/2009 | |
| JP | 2009-281577 | A | | 12/2009 | |

* cited by examiner

1
SP
80
IG
10
AP
20
21
BS
30
31
PKB
40
41
91
92
93
ECU
800
DRIVING DEVICE
100
TRANSMISSION DEVICE
200
210
50
PKB
500
ECB
400
60
300

FIG.5

| | | SHIFT SIGNAL | | | | | | | |
|---|---|---|---|---|---|---|---|---|---|
| | | P | R | N | D | B | FD | RV | MJ |
| SHIFT RANGE | P | ○ | | | | | | | ○ |
| | R | | ○ | | | | | ○ | ○ |
| | N | | | ○ | | | | | ○ |
| | D | | | | ○ | | ○ | | ○ |
| | (B) | | | | | ○ | ○ | | ○ |

IN NORMAL STATE

| | | INPUT SIGNAL | | | | | | | |
|---|---|---|---|---|---|---|---|---|---|
| | | P | R | N | D | B | FD | RV | MJ |
| SHIFT RANGE | P | ○ | | | ● | | | | ○ |
| | R | | ○ | | ● | | | ○ | ○ |
| | N | | | ○ | ● | | | | ○ |
| | D | | | | ○ | | ○ | | ○ |
| | (B) | | | | ● | ○ | ○ | | ○ |

P RANGE ABNROMALITY

IN ABNORMAL STATE (D-ON FAILURE)

START
S40
SYSTEM ACTIVATION REQUEST GIVEN?
NO
YES
S41
P SIGNAL AND MJ SIGNAL PRESENT ?
NO
YES
S42
DIFFERENT-TYPE SIGNAL PRESENT?
NO
YES
S43
DRIVE RANGE IDENTIFIED?
NO
YES
S44
P SIGNAL OR N SIGNAL PRESENT ?
NO
YES
S45
BRAKE ON?
NO
YES
S46
ACTIVATION OF SYSTEM
RETURN

CONTROL DEVICE FOR VEHICLE

TECHNICAL FIELD

The present invention relates to a control of a vehicle in the case where an abnormality occurs in a sensor for detecting a position of a shift lever.

BACKGROUND ART

Conventionally, there has been known a vehicle with a shift range switched in response to a detection result of a shift position sensor for detecting a position of a shift lever operated by a driver.

As to such a vehicle, Japanese Patent Laying-Open No. 2001-289067 (PTD 1) discloses that, even when an abnormality occurs which exhibits that a P (Parking) range cannot be determined based on a detection result of a shift position sensor, starting of a vehicle in an N (Neutral) range is allowed in the case where the N (Neutral) range can be determined based on the detection result of the shift position sensor.

CITATION LIST

Patent Document

PTD 1: Japanese Patent Laying-Open No. 2001-289067
PTD 2: Japanese Patent Laying-Open No. 2001-294056
PTD 3: Japanese Patent Laying-Open No. 2003-65436
PTD 4: Japanese Patent Laying-Open No. 2000-296728
PTD 5: Japanese Patent Laying-Open No. 2009-248912

SUMMARY OF INVENTION

Technical Problem

According to the technology disclosed in PTD 1, when an abnormality occurs which exhibits that the N range as well as the P range cannot be determined based on the detection result of the shift position sensor, starting of the vehicle cannot be allowed, thereby a fail-safe running of the vehicle cannot be performed.

The present invention was achieved to solve the problem described above, and its object is to improve a fail-safe running ability of the vehicle in the case where an abnormality occurs in the shift position sensor.

Solution to Problem

A control device according to the present invention controls a vehicle. The vehicle includes: a sensor outputting a shift signal in accordance with a shift operation performed by a user; a transmission device in which a shift range is switched in accordance with the shift signal, and fixing an axle of the vehicle when the shift range is a vehicle-stop range; and a braking device for applying a braking force to the vehicle in accordance with a braking operation performed by a user. The control device includes: a determination unit determining whether or not a sensor abnormality occurs which exhibits that the shift signal includes both of a vehicle-stop signal corresponding to the vehicle-stop range and a vehicle non-stop signal not corresponding to the vehicle-stop range; and a start control unit, in a case where the sensor abnormality occurs, allowing starting of the vehicle when a starting condition determined using at least any of the braking force and an abnormal form of the shift signal is met, and not allowing starting of the vehicle when the starting condition is not met.

Preferably, the starting condition is a condition that the braking force is greater than a predetermined value.

Preferably, the starting condition is a condition that the braking force is greater than the predetermined value and that no operation to an accelerator is performed by a user.

Preferably, the starting condition is a condition that the number of the vehicle non-stop signal included in the shift signal is less than the number of the vehicle-stop signal, and that the braking force is greater than a predetermined value.

Preferably, the starting condition is a condition that the shift signal includes the vehicle non-stop signal continuously even after the shift signal is changed into a state of including no vehicle-stop signal by a first shift operation, and that the shift signal is changed again into a state of including the vehicle-stop signal again by a second shift operation performed after the first shift operation.

Preferably, the starting condition is a condition that the vehicle non-stop signal is a signal corresponding to a drive range for allowing running of the vehicle.

Preferably, the starting condition is a condition that the shift signal is changed into a state of indicating a drive range for allowing driving of the vehicle by a first shift operation, and that the shift signal is changed into a state of including the vehicle-stop signal again by a second shift operation performed after the first shift operation procedures, and that the braking force is greater than a predetermined value.

Preferably, in a case where the sensor abnormality does not occur, the start control unit allows starting of the vehicle when determination is made that the shift range is the vehicle-stop range based on the shift signal.

Preferably, the vehicle includes a driving system for controlling running of the vehicle. The determination unit determines whether or not the sensor abnormality occurs during deactivation of the driving system. In a case where the starting condition is met during deactivation of the driving system, and a starting request is given by a user, the start control unit activates the driving system.

Advantageous Effects of Invention

According to the present invention, a fail-safe running ability of the vehicle for the case where an abnormality occurs in the shift position sensor can be improved.

BRIEF DESCRIPTION OF DRAWINGS

FIG. 5 represents combinations of shift signals and shift ranges in the case where the shift sensor is in a normal state.

DESCRIPTION OF EMBODIMENTS

Figure 1:
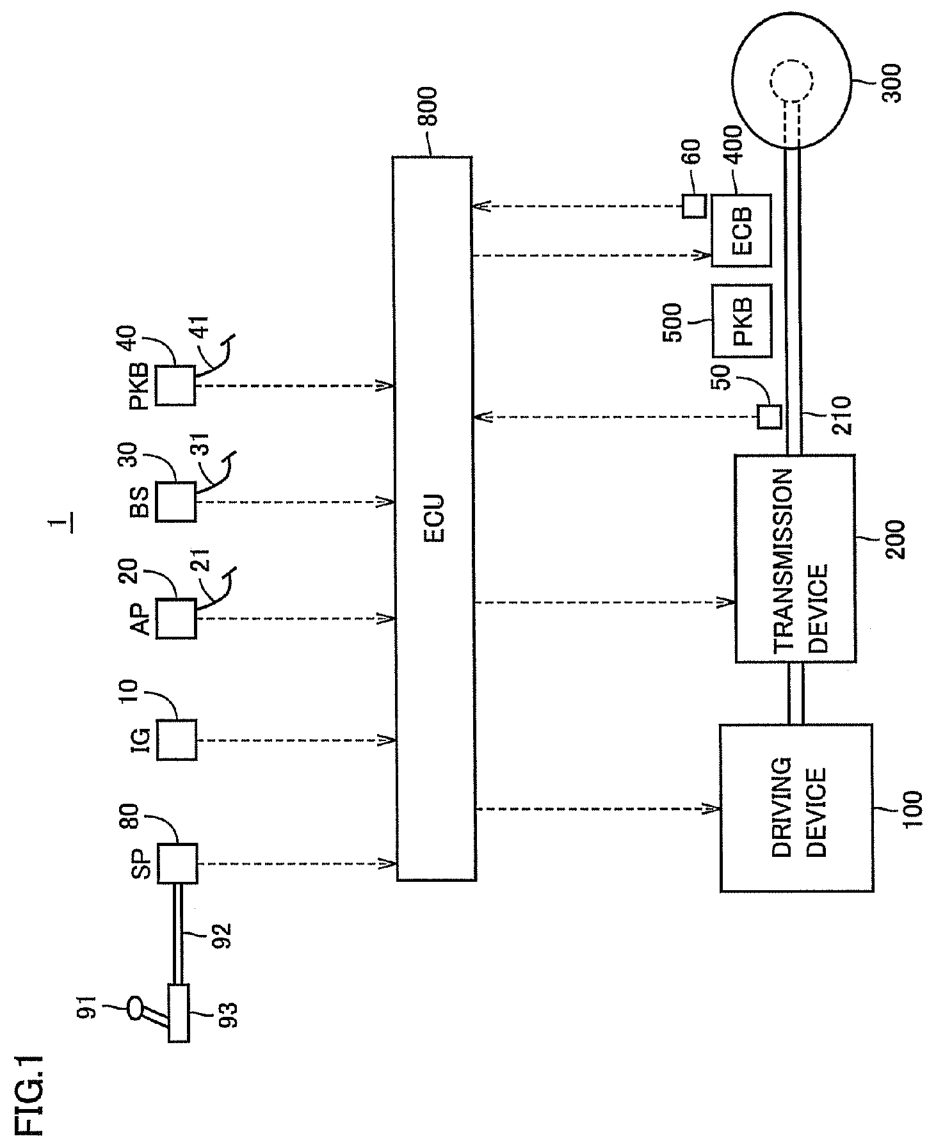
FIG. 1 is an overall block diagram representing a vehicle.

Hereinafter, embodiments of the present invention will be described with reference to the drawings. In the following description, the same parts have the same reference numerals allotted. They are named and function the same. Therefore, detailed description of these parts will not be repeated.

First Embodiment

FIG. 1 is an overall block diagram representing a vehicle 1 provided with a control device in accordance with the present embodiment. Vehicle 1 includes a driving device 100, a transmission device 200, wheels 300, an ECB (Electronically Controlled Brake System) 400, a PKB (Parking Brake) mechanism 500, and an ECU (Electronic Control Unit) 800. Further, vehicle 1 includes an IG switch 10, an accelerator pedal 21, a brake pedal 31, a PKB pedal 41, and a shift lever 91, which are operated by a user.

Driving device 100, transmission device 200, and ECB 400 are controlled by a control signal transmitted from ECU 800.

Driving device 100 is adapted to generate a driving force of vehicle 1. Driving device 100 is typically constituted by an engine and/or a motor, and the like.

Transmission device 200 is provided between driving device 100 and wheels 300 to change a rotational speed of driving device 100 and transmit the rotational speed to wheels 300. Transmission device 200 includes therein a plurality of frictional engagement elements (clutch and/or brake) for forming any transmission gear ratio among a plurality of transmission gear ratios, and a parking gear for fixing an output shaft 210 of transmission device 200. The control state (hereinafter, also referred to as "shift range") of transmission device 200 is switched to any of a P (Parking) range, an R (Reverse) range, an N (Neutral) range, a D (Drive) range, and a B (Brake) range in accordance with a control signal transmitted from ECU 800. Such a method of switching the shift range in accordance with an electric control is referred to as a shift-by-wire method. The B range means a shift range having a better efficacy of an engine brake than that of the D range. In the P range, the parking gear provided in transmission device 200 operates to fix output shaft 210 and suppresses rotations of wheels 300. In the following, fixing output shaft 210 using the parking gear provided in transmission device 200 is also referred to as "P-lock."

ECB (Electronically Controlled Brake System) 400 generates a brake hydraulic pressure in accordance with a stroke amount of brake pedal 31 and the like to apply a braking force to wheels 300.

PKB mechanism 500 is mechanically connected to PKB pedal 41 through a cable, a rod, and the like (not illustrated). PKB mechanism 500 mechanically works, in conjunction with an event that PKB pedal 41 is operated by a user at the time of parking or the like, to apply a braking force to output shaft 210 of transmission device 200. PKB mechanism 500 may be of a pedal type or a lever type.

IG (ignition) switch 10, an accelerator position sensor 20, a brake stroke sensor 30, a PKB sensor 40, a vehicle speed sensor 50, and a hydraulic pressure sensor 60 are connected to ECU 800 through a harness and the like.

IG switch 10 allows a user to input an activation request and a deactivation request for a driving system of vehicle 1 (electric equipment necessary for controlling running of vehicle 1). Positions of operated IG switch 10 include an IG-OFF position for bringing the driving system into a deactivated state (Ready-OFF state), an IG-ON position for applying power to the driving system, and a start position for bringing the driving system into an activated state (Ready-ON state).

Accelerator position sensor 20 detects a position AP of accelerator pedal 21 (accelerator position).

Brake stroke sensor 30 detects an operation amount (brake stroke) BS of brake pedal 31.

PKB sensor 40 detects presence of operation to PKB pedal 41 (operation of PKB mechanism 500).

Vehicle speed sensor 50 detects a vehicle speed V in accordance with a rotational speed of output shaft 210 of transmission device 200.

Hydraulic pressure sensor 60 detects a brake hydraulic pressure exerted by ECB 400.

Further, shift sensor 80 is connected to ECU 800. Shift sensor 80 is mechanically connected to shift lever 91, which is operated along a shift gate 93, through a push-pull cable 92. Shift sensor 80 outputs a shift signal, which is used for determining a shift range requested by a user, to ECU 800 in accordance with a position of shift lever 91. The shift signal includes a plurality of types of signals corresponding to shift ranges (described later). Shift sensor 80 may be provided in proximity to transmission device 200.

ECU 800 incorporates a CPU (Central Processing Unit) and a memory, which are not illustrated, and executes a predetermined arithmetic processing based on information stored in the memory and/or information transmitted from each sensor. ECU 800 controls each equipment provided in vehicle 1 based on a result of the arithmetic processing.

Figure 2:
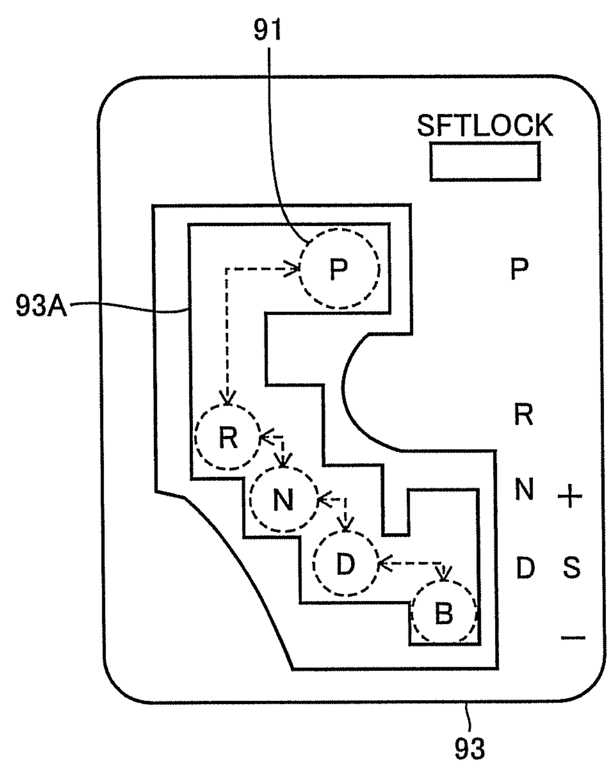
FIG. 2 represents a shift gate.

FIG. 2 represents shift gate 93. As shown in FIG. 2, shift gate 93 is provided with a groove 93A for regulating a moving path of shift lever 91. Shift lever 91 is moves along this groove 93A from the P position sequentially in the order of P, R, N, D, and B positions.

Figure 3:
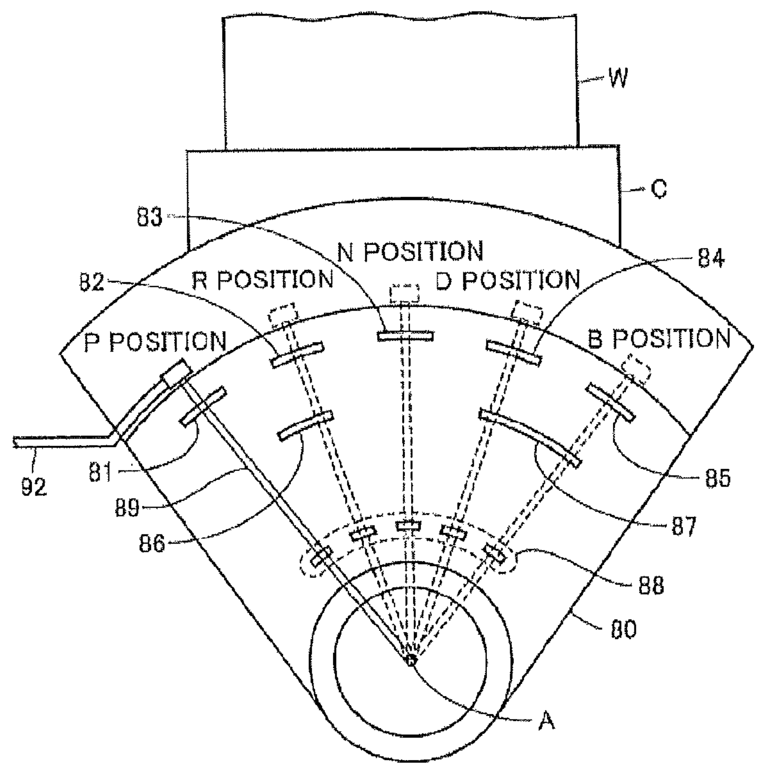
FIG. 3 schematically represents a structure of a shift sensor.

FIG. 3 schematically represents a structure of shift sensor 80. Shift sensor 80 includes first through eighth sensors 81-88, a movable lever 89, and a shift connector C. Shift connector C is connected to ECU 800 by means of a shift wire W.

Movable lever 89 has one end connected to push-pull cable 92 and the other end connected rotatably to a rotational shaft A. Movable lever 89 is rotated to a position corresponding to a position of shift lever 91 pivotally about rotational shaft A by push-pull cable 92 pushed and pulled in accordance with a shift operation performed by a user.

When movable lever 89 is located within the ranges corresponding respectively to the P position, R position, N position, D position, and B position, first through fifth sensors 81-85 come in contact with movable lever 89 to output the P signal, R signal, N signal, D signal, and B signal to ECU 800.

When movable lever 89 is located within the range corresponding to the R position, sixth sensor 86 comes into contact with movable lever 89 and outputs an RV signal to ECU 800. When movable lever 89 is located within the range corresponding to the D position and the B position, seventh sensor 87 comes into contact with movable lever 89 and outputs an FD (Forward) signal to ECU 800. When movable lever 89 is located within the ranges corresponding to the P, R, N, D, and B positions, eighth sensor 88 comes into contact with movable lever 89 and outputs an MJ signal to ECU 800.

Figure 4:
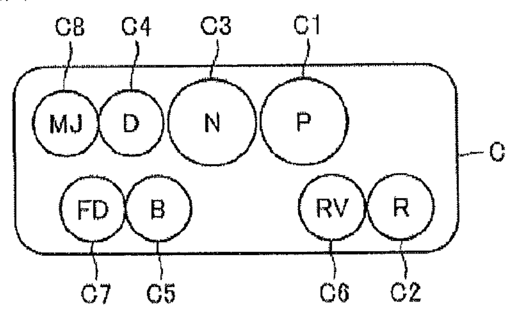
FIG. 4 represents a cross-sectional shape of a shift connector.

FIG. 4 represents a cross-sectional shape of shift connector C. Shift connector C includes connectors C1-C8 for outputting the P signal, R signal, N signal, D signal, B signal, RV signal, FD signal, and MJ signal respectively. Each of the signals outputted from these connectors C1-C8 is inputted to ECU 800 through shift wire W.

FIG. 5 represents combinations of the shift signals and the shift ranges for the case where shift sensor 80 is in a normal state. In FIG. 5, the circles indicate that each of the signals P-MJ is detected. When the P signal and the MJ signal are detected, ECU 800 determines that the shift range is in the P range. When the R signal, the RV signal, and the MJ signal are detected, ECU 800 determines that the shift range is in the R range. Determination for each of the ranges subsequent to the N range is performed in a similar manner. As described above, ECU 800 determines the shift range in accordance with the combinations of the signals P-MJ included in the shift signal. ECU 800 then controls transmission device 200 to achieve the determined shift range.

In vehicle 1 having such a configuration described above, when the driving system of vehicle 1 is deactivated, the shift range is generally controlled to the P range and applied with the P-lock by a user. Therefore, during the deactivation of the driving system, even when an abnormality occurs which exhibits that the P signal and the MJ signal corresponding to the P range as well as a different-type signal other than these are detected concurrently (hereinafter, also referred to as "P range abnormality"), it is highly assumed that the P signal and the MJ signal are correct while the different-type signal other than these signals is abnormal. However, in a precise sense, the abnormality due to the P signal and the MJ signal and the abnormality due to the different-type signal cannot be distinguished. Therefore, the P range cannot be determined.

Figures 6, 7:
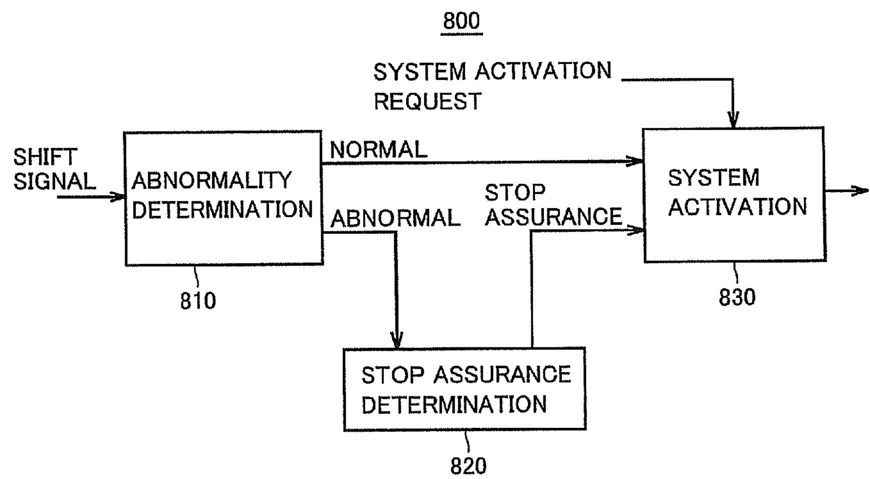
FIG. 6 represents combinations of the shift signals and the shift ranges in the case where the shift sensor is in an abnormal state.
FIG. 7 is a functional block diagram representing an ECU.

FIG. 6 represents combinations of the shift signals and the shift ranges for the case where shift sensor 80 has an abnormality (the case where a D-ON failure occurs which exhibits that the D signal is always in the ON state). For example, when the D-ON failure occurs in the P range, not only the P signal and the MJ signal corresponding to the P range but also the D signal not corresponding to the P range is inputted to ECU 800. Such an abnormal pattern is the P range abnormality.

Conventionally, only when a system activation request was given by a user, and the P range could be determined based on the shift signal, the driving system was activated. This is for the purpose of ensuring the stopped state of vehicle 1 to be maintained with the P-lock even when a driving force not expected by a user was generated at the time of activating the driving system. Therefore, conventionally, since the P-lock could not be ensured when the P range abnormality occurred, the activation of the driving system was prohibited. Consequently, it was inconvenient since vehicle 1 could not perform the fail-safe running to go to a repair plant by activation even when the P range abnormality was detected.

According to the present embodiment, in the aim of solving such conventional problems, the activation of the driving system is allowed to enable the fail-safe running of vehicle 1 under the condition that, means other than the P-lock, such as a hydraulic pressure braking force and a parking braking force, can additionally ensure vehicle 1 to be maintained in the stopped state even with the P range abnormality. This point is the most particular feature of the present embodiment.

FIG. 7 is a functional block diagram representing ECU 800 at parts related to the activation of the driving system. Each of the functional blocks shown in FIG. 7 may be realized by hardware, or may be realized by software.

ECU 800 includes an abnormality determination unit 810, a stop assurance determination unit 820, and a system activation unit 830.

During the deactivation of the driving system, abnormality determination unit 810 determines whether or not the P range abnormality described above occurs, in other words, whether the P signal and the MJ signal as well as an additional different-type signal other than the P signal and the MJ signal are included in the shift signal.

In the case where the P range abnormality occurs, stop assurance determination unit 820 determines whether or not the vehicle-stopped state can be assured by means other than the P-lock. For example, stop assurance determination unit 820 determines that the vehicle-stopped state can be assured in the brake-ON state. Herein, the brake-ON state refers to the state where the hydraulic pressure braking force exerted by ECB 400 or the parking braking force exerted by PKB mechanism 500 is beyond the value capable of maintaining the vehicle-stopped state.

In the case where P range abnormality does not occur, system activation unit 830 allows the activation of the driving system when the shift range is determined to be in the P range based on the shift signal.

Further, even in the case where the P range abnormality occurs, system activation unit 830 allows the activation of the driving system when stop assurance determination unit 820 determines that the vehicle-stopped state can be assured. Otherwise, system activation unit 830 prohibits the activation of the driving system.

In the case where a system activation request is given by a user, when the activation of the driving system is allowed, system activation unit 830 activates the driving system. When the activation of the driving system is prohibited, the driving system is not activated.

Figure 8:
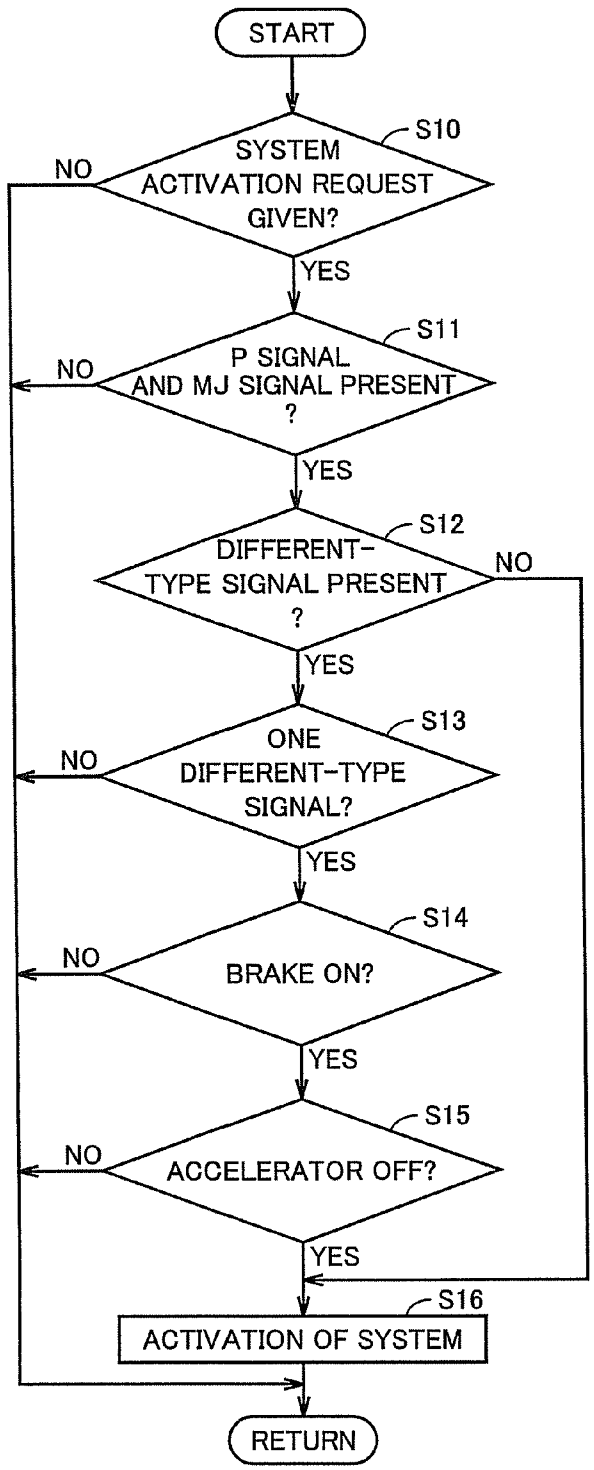
FIG. 8 is a (first) flowchart representing process procedures of the ECU.

FIG. 8 is a flowchart representing process procedures of ECU 800 for realizing the functions described above. The flowchart of FIG. 8 is executed repeatedly in a predetermined cycle during the deactivation of the driving system of vehicle 1.

In step (hereinafter, the term "step" is abbreviated to "S") 10, ECU 800 determines presence of a system activation request given by a user. The determination is performed based on a detection result of IG switch 10.

When no system activation request is given (NO in S10), ECU 800 allows the process to be terminated.

On the other hand, when the system activation request is given (YES in S10), ECU 800 allows the process to proceed to S11 and determines whether or not the shift signal includes signals corresponding to the P range (the P signal and the MJ signal).

When the shift signal does not include the P signal and the MJ signal (NO in S11), no P range is present in the first place. Therefore, ECU 800 allows the process to be terminated and does not activate the system.

On the other hand, when the shift signal includes the P signal and the MJ signal (YES in S11), ECU 800 allows the process to proceed to S12 and determines whether or not the P range abnormality is present, in other words, whether or not the shift signal includes a different-type signal (a signal other than the P signal and the MJ signal).

When the different-type signal is not included (NO in S12), presence of the P range can be determined. Therefore, ECU 800 allows the process to proceed to S16 and activates the driving system.

On the other hand, when the signal of the different type is included (YES in S12), ECU 800 allows the process to proceed to S13 and determines whether or not the number of different-type signals is one. This determination is adapted to determine whether or not the number of different-type signals is less than the number of signals corresponding to the P range (two including the P signal and the MJ signal). Therefore, for example, when there are three signals corresponding to the P range, determination should be made that the number of different-type signals is less than or equal to two.

When there is one different-type signal (YES in S13), it is considered that a single failure of the different-type signal occurs rather than a double failure of the P signal and the MJ signal. Therefore, ECU 800 allows the process to proceed to S14 and determines whether or not the brake-ON state described above is present. This determination is performed based on determination such as whether or not the brake hydraulic pressure is greater than or equal to a threshold value, whether or not the brake stroke is greater than or equal to a threshold value, whether or not the PKB signal is in the ON-state, and the like. The threshold values used for the determination are set to have values capable of maintaining the stopped state of vehicle 1 sufficiently even in the case where the driving force is applied to vehicle 1 while a torque cannot be cancelled.

When the brake-ON state is not present (NO in S14), the vehicle-stopped state cannot be assured. Therefore, ECU 800 allows the process to be terminated, and does not activate the system.

On the other hand, when the brake-ON state is present (YES in S14), ECU 800 allows the process to proceed to S15 and determines whether or not the accelerator-OFF state is present. This determination is adapted to securely assure the vehicle-stopped state during the activation of the system.

When the accelerator-OFF state is not present (NO in S15), ECU 800 allows the process to be terminated and does not activate the system.

On the other hand, when the accelerator-OFF state is present (YES in S15), ECU 800 allows the process to proceed to S16 and activates the driving system.

As described above, even in the case where the P range abnormality occurs, ECU 800 according to the present embodiment allows activation of the driving system under the condition that the vehicle-stopped state can be assured additionally by means other than the P-lock. Therefore, even in the case where the P range abnormality occurs, the driving system can be activated. Consequently, the fail-safe running ability of vehicle 1 can be improved.

In so-called hybrid vehicle including an engine and a motor as driving device 100, an engine is often started for warm-up during the activation of the driving system. However, there is a hybrid vehicle having a structure in which a driving force is exerted to vehicle 1 by a reactive force at the time of starting an engine. In the hybrid vehicle having such a configuration, when the driving system is activated while the P range abnormality is present, only the driving system may be activated without activating the engine, which is different from the normal manner. Accordingly, the driving system can be activated while more securely assuring the vehicle-stopped state.

Second Embodiment

In the first embodiment, in the case where the P range abnormality occurs, the activation of the driving system is allowed under the condition that the vehicle-stopped state can be assured additionally by means other than the P-lock.

On the other hand, according to the second embodiment, the activation of the driving system is allowed under the condition that abnormality of the different-type signal other than the P signal and the MJ signal is assumed with sufficient degree of reliability in the case where the P range abnormality occurs. For example, as shown in FIG. 6 described above, the P signal and the MJ signal as well as the D signal are detected in the case where the D-ON failure has occurred, and where shift lever 91 is located at the P position. When a user moves shift lever 91 from the P position to the N position, the P signal disappears and the N signal newly appears. However, the D signal and the MJ signal are detected continuously. In the case where such an abnormality pattern is detected, and the D signal is assumed to be in the normal state, the failure should occur which exhibits that at least the P signal-ON and the N signal-ON are present concurrently in the D range. However, since the P signal and N signal are not actually detected concurrently, the D signal is extremely less likely to be in a normal state. Therefore, in the case where such an abnormality pattern is detected, the D signal is assumed to have an abnormality with sufficient degree of reliability. Consequently, ECU 800 determines that the P-lock is present even when the P range abnormality appears during the trip, and allows the activation of the system. Since other structure, function, and process are the same as those of the first embodiment described above, detailed description thereof will not be repeated.

Figure 9:
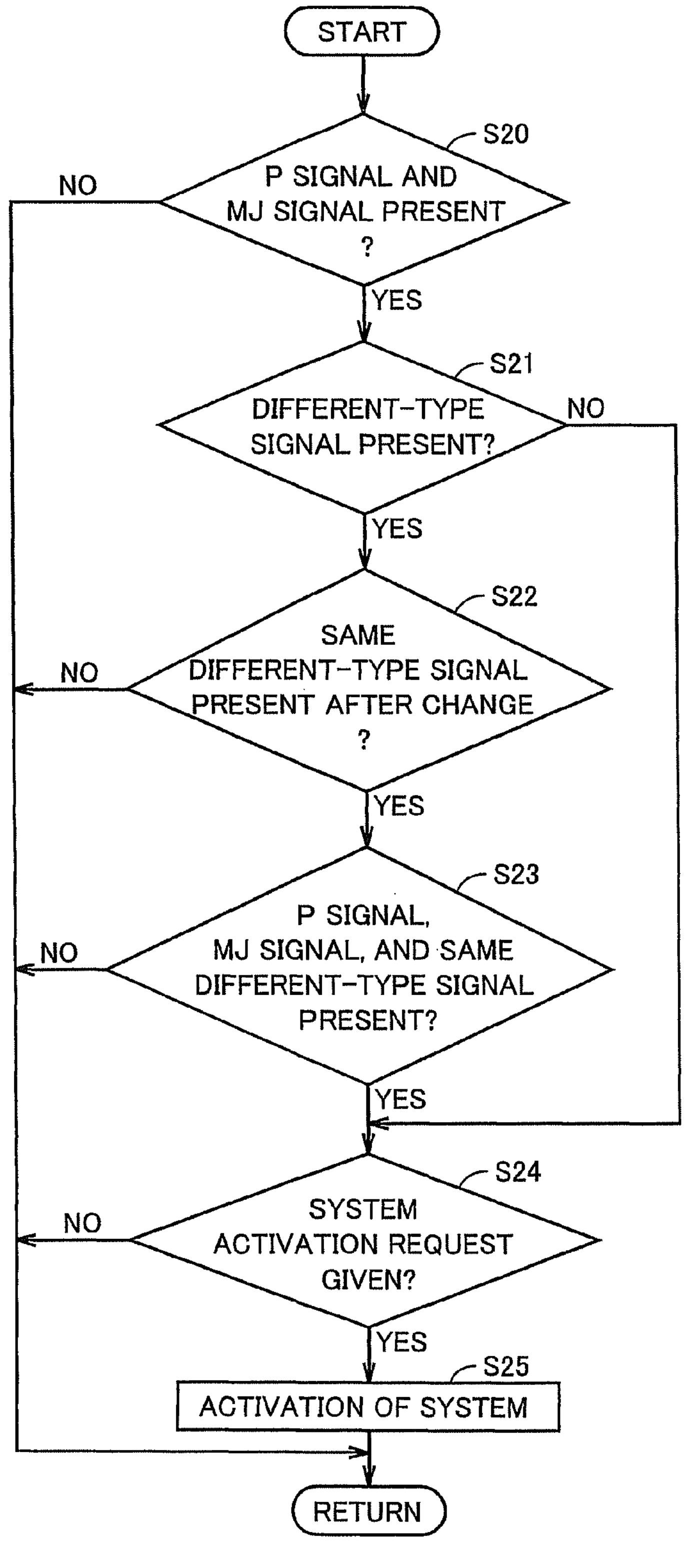
FIG. 9 is a (second) flowchart representing process procedures of the ECU.

FIG. 9 represents a flowchart showing the process procedures of ECU 800 according to the second embodiment. The flowchart of FIG. 9 is executed repeatedly with a predetermined cycle during the deactivation of the driving system of vehicle 1.

In S20, ECU 800 determines whether or not the shift signal includes the P signal and the MJ signal corresponding to the P range.

When the shift signal does not include the P signal and the MJ signal (NO in S20), ECU 800 allows the process to be terminated.

On the other hand, when the shift signal includes the P signal and the MJ signal (YES in S20), ECU 800 allows the process to proceed to S21 and determines whether or not the shift signal includes a different-type signal other than the P signal and the MJ signal.

When a different-type signal is not included (NO in S21), ECU 800 allows the process to proceed to S23.

On the other hand, when the different-type signal is included (YES in S21), ECU 800 allows the process to proceed to S22 and determines whether or not the shift signal includes the same different-type signal even after the combination of the shift signal was changed by the shift operation performed by a user.

When the same different-type signal is not included in the shift signal (NO in S22), ECU 800 allows this process to be terminated.

On the other hand, when the shift signal includes the same different-type signal (YES in S22), the different-type signal is assumed to have an abnormality with sufficient degree of reliability. Therefore, ECU 800 allows the process to proceed to S23 and determines whether or not the shift signal is changed into the state of including the P signal, the MJ signal, and the same different-type signal while not including other signal by the subsequent shift operation. This process is adapted to determine whether or not a user has performed the operation of moving shift lever 91 back to the P position again.

When the shift signal is not change into the state of including the P signal, the MJ signal, and the same different-type signal (NO in S23), ECU 800 allows the process to be terminated.

On the other hand, when the shift signal is changed into the state of including the P signal, the MJ signal, and the same different-type signal (YES in S23), it is considered that a user has moved shift lever 91 back to the P position. Therefore, ECU 800 allows the process to proceed to S24.

In S24, ECU 800 determines presence of a system activation request given by a user. Then, in the case where a system activation request is given (YES in S24), ECU 800 activates the driving system (S25); and otherwise (NO in S24) terminates the process without activating the driving system. The determination as to presence of the system activation request (process in S24) may be executed before any of the processes of S20-S23. In this case, the system activation is preferably completed at least within the predetermined time from reception of a system activation request.

As described above, even in the case where the P range abnormality occurs, when the different-type signal not corresponding to the P range is assumed to be abnormal with sufficient reliability based on the forms of changing combinations of the shift signals, ECU 800 according to the second embodiment allows the activation of the driving system. Therefore, even in the case where the P range abnormality occurs, the driving system can be activated. Consequently, the fail-safe running ability of vehicle 1 can be improved.

Third Embodiment

According to the first embodiment, when the P range abnormality occurs, the activation of the driving system is allowed under the condition that the vehicle-stopped state can be assured additionally by means other than the P-lock.

On the other hand, according to the third embodiment, when the P range abnormality occurs, activation of the driving system is allowed under the condition that the different-type signal other than the P signal and the MJ signal corresponds to the drive range (in other words, the drive range can be determined after the activation of the system). Herein, the drive range corresponds to a shift range adapted to generate a driving force to allow running of vehicle 1 and is any of the D range, the B range, and the R range. Since other structure, function, and process are the same as those of the first embodiment described above, detailed description will not be repeated.

Figure 10:
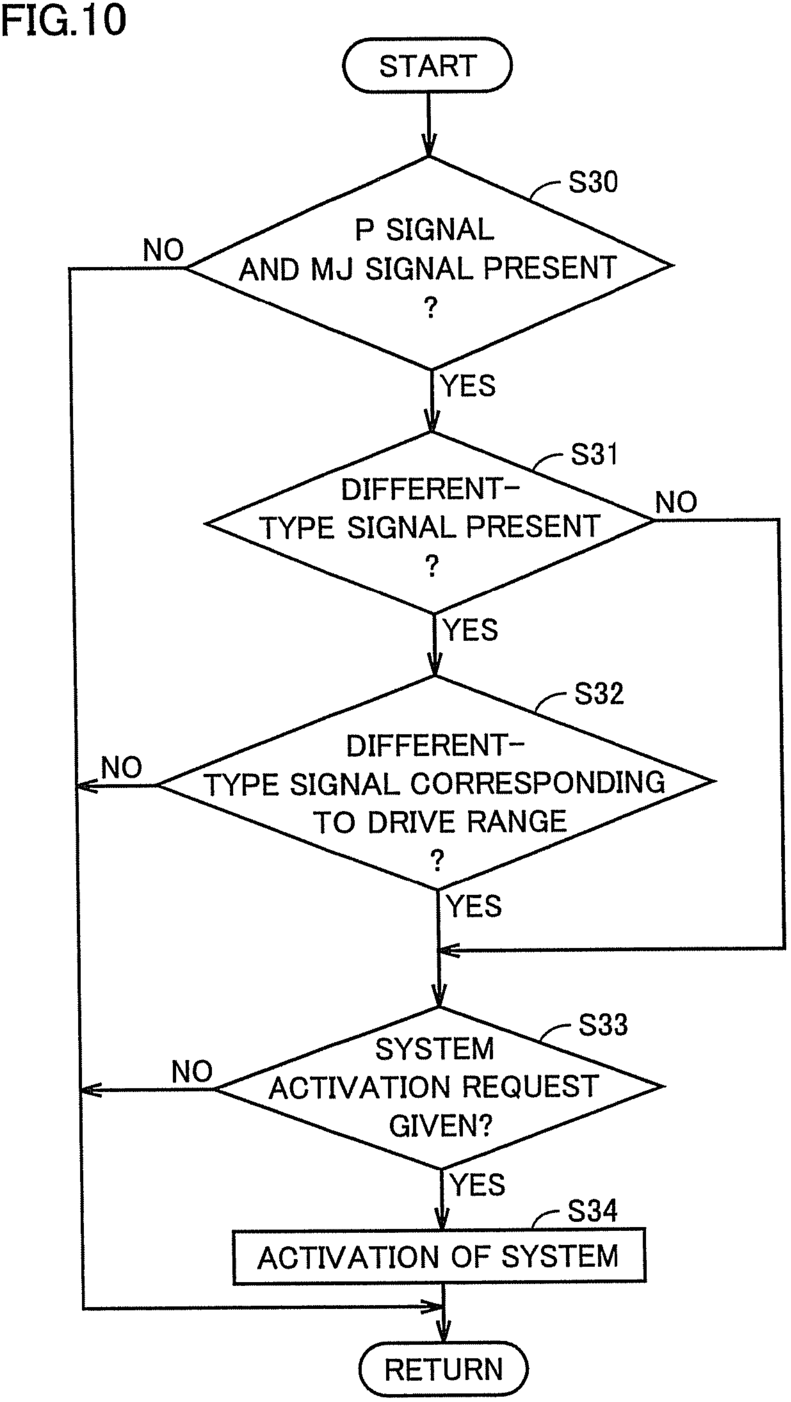
FIG. 10 is a (third) flowchart representing process procedures of the ECU.

FIG. 10 is a flowchart representing the process procedures of ECU 800 in accordance with the third embodiment.

In S30, ECU 800 determines whether or not the shift signal includes the P signal and the MJ signal.

When the shift signal does not include the P signal and the MJ signal (NO in S30), ECU 800 allows the process to be terminated.

On the other hand, when the shift signal includes the P signal and the MJ signal (YES in S30), ECU 800 allows the process to proceed to S31, and determines whether or not the shift signal includes the different-type signal other than the P signal and the MJ signal.

When the different-type signal is not included (NO in S31), presence of the P range can be determined. Therefore, ECU 800 allows the process to proceed to S33.

On the other hand, when the different-type signal is included (YES in S31), ECU 800 allows the process to proceed to S32 and determines whether or not the different-type signal is a signal corresponding to the drive range. The signal corresponding to the drive range is any of: the R signal and the RV signal corresponding to the R range; the D signal and the FD signal corresponding to the D range; and the B signal and the FD signal corresponding to the B range.

In the case where the different-type signal is not a signal corresponding to the drive range (NO in S32), even when the driving system is activated, it cannot be determined thereafter that the shift range is in the drive range (any of the D range, R range, and B range) based on the shift signal. Therefore, ECU 800 allows the process to be terminated, and does not activate the system.

On the other hand, in the case where the different-type signal is a signal corresponding to the drive range (YES in S32), ECU 800 allows the process to proceed to S33.

In S33, ECU 800 determines presence of the system activation request given by a user. When the system activation request is given (YES in S33), ECU 800 activates the driving system (S34); and otherwise (NO in S33) terminates the process without activating the driving system.

As described above, even in the case where the P range abnormality occurs, when the different-type signal other than the P signal and the MJ signal is a signal corresponding to the drive range, ECU 800 according to the third embodiment can determine that the shift range is the drive range based on the shift signal after activating the driving system. Therefore, ECU 800 allows activation of the driving system. Accordingly, even in the case where the P range abnormality occurs, the fail-safe running of vehicle 1 can be performed. On the other hand, in the case where the different-type signal is not a signal corresponding to the drive range, determination cannot be made that the shift range is in the drive range cannot be made based on the shift signal even with the activation of the driving system. Therefore, the activation of the driving system is not performed in advance. Consequently, an event that the drive range cannot be switched after the activation of the driving system can be prevented.

Fourth Embodiment

According to the third embodiment, in the case where the P range abnormality occurs, the activation of the driving system is allowed under the condition that the determination that the drive range is present can be made after the system activation.

On the other hand, according to the fourth embodiment, in the case where the P range abnormality occurs, when the shift signal is changed into the state of indicating the drive range by the shift operation, and is further changed into the state of including the signal (P signal) corresponding to the P range or the signal (N signal) corresponding to the N range by the subsequent shift operation, the activation of the driving system is allowed. Other structure, function, and the process are the same as those of the first embodiment described above. Therefore, the detailed description will not be repeated.

Figure 11:
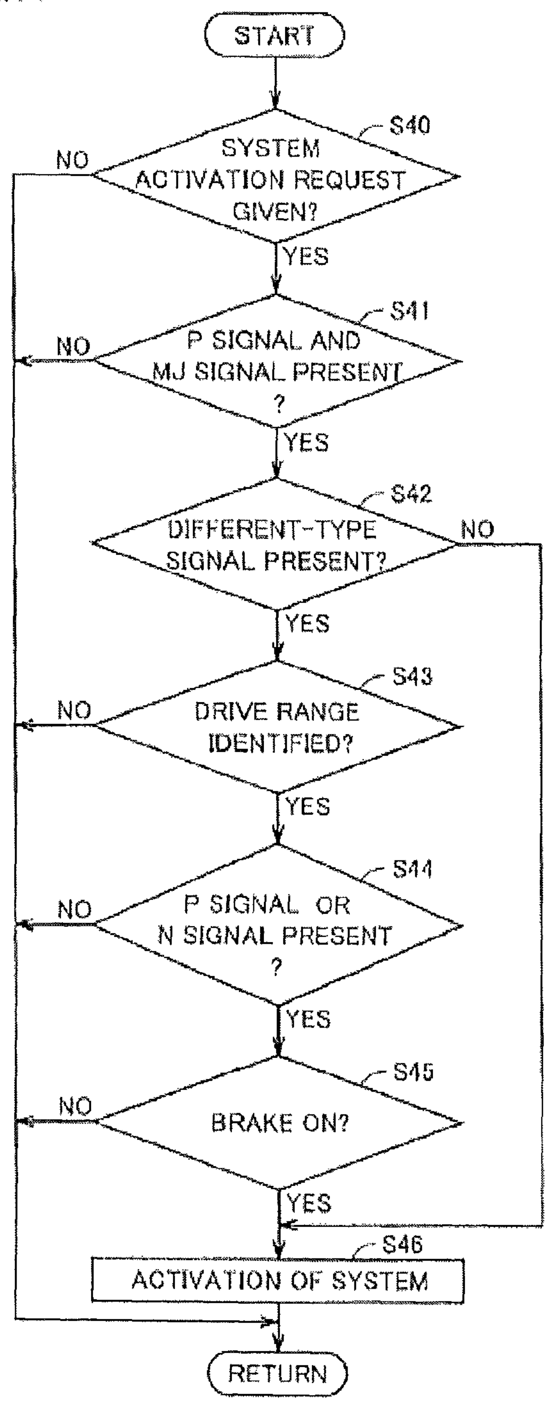
FIG. 11 is a (fourth) flowchart representing process procedures of the ECU.

FIG. 11 is a flowchart representing the process procedures of ECU 800 according to the fourth embodiment.

In S40, ECU 800 determines presence of a system activation request given by a user.

When the system activation request is not given (NO in S40), ECU 800 allows the process to be terminated.

On the other hand, when the system activation request is given (YES in S40), ECU 800 allows the process to proceed to S41 and determines whether or not the shift signal includes the signal (the P signal and the MJ signal) corresponding to the P range.

When the P signal and the MJ signal are not included in the shift signal (NO in S41), ECU 800 allows the process to be terminated.

On the other hand, when the P signal and the MT signal are included in the shift signal (YES in S41), ECU 800 allows the process to proceed to S42 and determines whether or not the shift signal includes the different-type signal other than the P signal and the MJ signal.

When the different-type signal is not included (NO in S42), presence of the P range can be determined. Therefore, ECU 800 allows the process to proceed to S46 and activates the driving system.

On the other hand, in the case where the different-type signal is included (YES in S42), ECU 800 allows the process to proceed to S43 and determines whether or not the shift range is identified as the drive range (any of the D, B, and R ranges), in other words, whether or not the shift signal is changed into the state of indicating the drive range is produced.

When presence of the drive range is not identified (NO in S43), ECU 800 allows the process to be terminated.

On the other hand, when presence of the drive range is identified (YES in S43), ECU 800 allows the process to proceed to S44 and determines whether or not the shift signal is changed into the state of including the P signal or the N signal by a shift operation performed after presence of the drive ran is identified.

When the shift signal is not changed into the state of including the P signal or the N signal (NO in S44), ECU 800 allows the process to be terminated.

On the other hand, when the shift signal is changed into the state of including the P signal or the N signal (YES in S44), ECU 800 allows the process to proceed to S45 and determines whether or not the brake-ON state is present.

When the brake-ON state is not present (NO in S45), ECU 800 allows the process to be terminated.

On the other hand, in the case where the brake-ON state is present (YES in S45), ECU 800 allows the process to proceed to S46 and activates the driving system.

As described above, even in the case where the P range abnormality occurs, when the shift signal is changed into the state of indicating the drive range by the shift operation, and is further changed into the state of including the signal (P signal) corresponding to the P range or the signal (N signal) corresponding to the N range by the subsequent shift operation, ECU 800 according to the fourth embodiment allows the activation of the driving system. Accordingly, even when the P range abnormality occurs, the fail-safe running of vehicle 1 can be performed.

Modified Example of the Fourth Embodiment

According to the fourth embodiment described above, whether or not the brake-ON state is present is determined in the process of S45 in FIG. 11. In this process, whether or not the accelerator-OFF state is present may be determined in addition to the determination on whether or not the brake-ON state is present.

Figure 12:
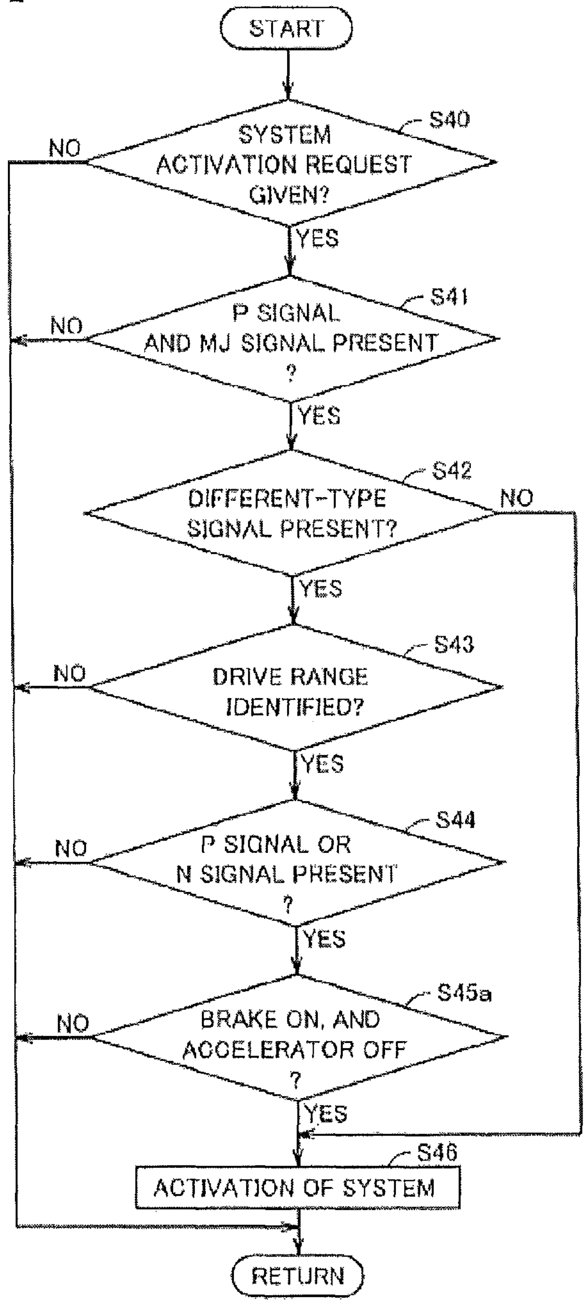
FIG. 12 is a (fifth) flowchart representing process procedures of the ECU.

FIG. 12 is a flowchart representing the process procedures of ECU 800 in accordance with the modified example of the fourth embodiment. In the flowchart shown in FIG. 12, the point different from the flowchart shown in FIG. 11 described above is that the process of S45*a* is performed in place of the process of S45. Other processes are the same processes and have the same step numbers allotted. Therefore, detailed description as to those will not be repeated.

When the shift signal is changed into the state of including the P signal or the N signal is produced (YES in S44), ECU 800 allows the process to proceed to S45*a*, and determines whether or not the brake-ON state and the accelerator-OFF state are present.

When the brake-ON state and the accelerator-OFF state are not present (NO in S45*a*), ECU 800 allows the process to be terminated.

On the other hand, in the case where the brake-ON state and the accelerator-OFF state are present (YES in S45*a*), ECU 800 allows the process to proceed to S46 and activates the driving system (S46).

As described above, adding the accelerator-OFF state to the brake-ON state to the condition can securely assure the vehicle-stopped state at the time of activation of the system.

The contents of the above-described embodiments 1-4 (including the modified embodiment) may have combinations of two or more embodiments.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST

1 vehicle; 10 IG switch; 20 accelerator position sensor; 21 accelerator pedal; 30 brake stroke sensor; 31 brake pedal; 40 PKB sensor; 41 PKB pedal; 50 vehicle speed sensor; 60 hydraulic pressure sensor; 80 shift sensor; 81-88 first—eighth sensors; 89 movable lever; 91 shift lever; 92 push-pull cable; 93 shift gate; 93A groove; 100 driving device; 200 transmission device; 210 output shaft; 300 wheels; 400 ECB; 500 PKB mechanism; 800 ECU; 810 abnormality determination unit; 820 stop assurance determination unit; 830 system activation unit.

The invention claimed is:

1. A control device for a vehicle, said vehicle including:

a driving system for controlling running of said vehicle;

a sensor outputting a shift signal in accordance with a shift operation performed by a user;

a transmission device in which a shift range is switched in accordance with said shift signal, and fixing an axle of said vehicle when said shift range is a vehicle-stop range; and a braking device for applying a braking force to said vehicle in accordance with a braking operation performed by a user, said control device comprising:

a determination unit determining whether or not a sensor abnormality occurs which exhibits that said shift signal includes both of a vehicle-stop signal corresponding to said vehicle-stop range and a vehicle non-stop signal not corresponding to said vehicle-stop range; and an activation control unit, in a case where said sensor abnormality occurs, allowing activation of said driving system when an activating condition determined using at least any of said braking force and an abnormal form of said shift signal is met, and not allowing activation of said driving system when said activating condition is not met, wherein said activating condition is a first condition that said shift signal includes said vehicle non-stop signal continuously even after said shift signal is changed into a state of including no vehicle-stop signal by a first shift operation, and that said shift signal is changed again into a state of including said vehicle-stop signal by a second shift operation performed after said first shift operation, or a second condition that said shift signal is changed into a state of indicating a drive range for allowing driving of said vehicle by a third shift operation, and that the shift signal is changed into a state of including said vehicle-stop signal again by a fourth shift operation performed after the third shift operation, and that said braking force is greater than a predetermined value.

2. The control device for a vehicle according to claim 1, wherein in a case where said sensor abnormality does not occur, said activation control unit allows activation of said driving system when determination is made that said shift range is said vehicle-stop range based on said shift signal.

3. The control device for a vehicle according to claim 1, wherein said determination unit determines whether or not said sensor abnormality occurs during deactivation of said driving system, and in a case where said activating condition is met during deactivation of said driving system, and an activating request is given by a user, said activation control unit activates said driving system.

* * * * *